US006922997B1

(12) United States Patent
Larson et al.

(10) Patent No.: US 6,922,997 B1
(45) Date of Patent: Aug. 2, 2005

(54) ENGINE BASED KINETIC ENERGY RECOVERY SYSTEM FOR VEHICLES

(75) Inventors: Gerald L. Larson, Fort Wayne, IN (US); Paul W. O'Malley, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 25 days.

(21) Appl. No.: 10/771,059

(22) Filed: Feb. 3, 2004

(51) Int. Cl.[7] .......................... F02G 3/00; F01B 29/04; F02N 9/00
(52) U.S. Cl. ........................ 60/611; 60/616; 60/597; 60/712; 60/626
(58) Field of Search ................................. 123/320–322, 123/560; 60/698, 712, 716, 281, 611, 618, 60/616, 626, 597; 417/364; 477/156, 92; 180/14.3

(56) References Cited

U.S. PATENT DOCUMENTS

| | | | |
|---|---|---|---|
| 3,823,792 A * | 7/1974 | Dinkloh et al. ............ 180/14.3 |
| 3,986,575 A * | 10/1976 | Eggmann ..................... 60/616 |
| 4,290,268 A | 9/1981 | Lowther |
| 4,520,840 A | 6/1985 | Michel |
| 4,798,053 A * | 1/1989 | Chang ........................ 60/712 |
| 4,882,906 A * | 11/1989 | Sekiyama et al. .......... 417/364 |
| 5,119,633 A | 6/1992 | Brooks et al. |
| 5,505,675 A * | 4/1996 | Kuriyama et al. .......... 477/156 |
| 5,549,174 A * | 8/1996 | Reis ............................. 60/618 |
| 5,819,538 A * | 10/1998 | Lawson, Jr. .................. 60/611 |
| 5,830,105 A * | 11/1998 | Iizuka ........................ 477/92 |
| 5,884,482 A | 3/1999 | Lange et al. |
| 6,023,929 A | 2/2000 | Ma |
| 6,314,734 B1 | 11/2001 | Enander |
| 6,568,186 B2 * | 5/2003 | Zaleski ........................ 60/698 |

FOREIGN PATENT DOCUMENTS

KR       2002048252 A  *  6/2002  ........... B60T 13/26

* cited by examiner

Primary Examiner—Thai-Ba Trieu
(74) Attorney, Agent, or Firm—Jeffrey P. Calfa; Dennis Kelly Sullivan; Susan L. Lukasik

(57) ABSTRACT

A motor vehicle kinetic energy recovery system uses one or more cylinders of an internal combustion engine as the first or primary stage in a multi-stage high pressure air compression system, a compressed air storage system, compressed air operated drive train boosters and vehicle management electronics to provide cooperation between the air compression, storage and booster systems. The multi-stage, high pressure air compressor system is operable through engine compression braking allowing kinetic energy of a vehicle to be recaptured during retardation of vehicle speed.

15 Claims, 10 Drawing Sheets ical field

The invention relates to vehicles with internal combustion engines and more particularly, to a kinetic energy recovery system for such vehicles.

DESCRIPTION OF THE PROBLEM

Most motor vehicles equipped with internal combustion engines dissipate kinetic energy during stopping through use of friction brakes and engine compression braking, rather than capturing and storing the energy for reuse. It is widely recognized that this arrangement is highly wasteful of energy and that recapture of the energy for use in moving the vehicle from standing starts is desirable. However, prior attempts to provide for recapture of the energy for reuse, as represented by hybrid gasoline/electric vehicles, have been difficult to justify economically at low energy prices. These vehicles use both an internal combustion engine and electric motors to move the vehicle. During braking the motors operate as generators to retard the vehicle and convert the vehicle's kinetic energy to electricity which is stored in batteries. This power can then be used to power the motors and move the vehicle. Such vehicles are highly efficient. However, they are also very complex and as a result cost substantially more to design and build than conventional vehicles. They also have high maintenance costs associated with periodically replacing the battery plant.

An effective energy recovery system for a vehicle using an internal combustion engine must provide for the efficient storage of the recaptured energy. Alternatives to battery storage include fly wheels and compressed air. Implementation of systems based on these alternative modes of energy storage have been hobbled by the limitations of the recapture and utilization mechanisms.

Considering compressed air systems in particular, designers have typically looked to clutching the wheels to air pumps to provide vehicle speed retardation and a source of high pressure air. This has been done notwithstanding the fact that the engine itself is a pump, is connected to some of the wheels by the vehicle's drive line and can be used for engine compression braking. Unfortunately, even diesel engines, when operated as pumps, operate at too low of a pressure to provide an efficient and compact kinetic energy capture and utilization system.

Engine compression braking is implemented by operating an internal combustion engine as an air compressor and then dissipating the energy stored compressing the air through the vehicle's exhaust. In order to run a diesel as a compressor, fuel flow is cut off to one or more the engine's cylinders. The vehicle's momentum is coupled back to the engine crankshaft by the vehicle drive train causing the pistons in the non-firing cylinders to continue to cycle. The cylinders' intake valves operate to allow air to be drawn for compression strokes, but the cylinders' exhaust valves are opened at or just before top dead center (TDC) of the pistons' compression cycles to exhaust the air, releasing the energy potential of the compressed gas air. The energy is dissipated in friction upon release to the open atmosphere. Internal combustion engines can dissipate vehicle kinetic energy at a rate close to the engine's rated power.

Internal combustion engines operate as relatively low compression pumps. A diesel may generate approximately a 25 to 1 compression ratio, meaning that air drawn into the cylinder at close to ambient pressure is compressed to no greater than about 375 psi. In practice only about 300 psi is achieved due to a partial vacuum in the intake manifold and frictional losses. Absent some modification of a cylinder to operate as a higher compression pump, which complicates the engine and may compromise its performance, the compressed air must be recovered from the exhaust manifold, which entails storage at a still lower pressure.

Assuming that air of sufficient pressure can be made available to propel the vehicle on taking of from a standing start, a question has also remained of how, and when, to make use of the compressed air. Also of interest is when and how to run the engine for air compression to optimize vehicle operation and reduce pollution. What is needed is a way of boosting pump operation of an internal combustion engine on a vehicle to sufficiently high pressures to be used for moving the vehicle, all while minimizing changes to the vehicles drive train and engine to produce a system both economical and reliable.

SUMMARY OF THE INVENTION

One object of the invention is to improve the efficiency of motor vehicles equipped with internal combustion engines.

Another object of the invention is to provide recovery of kinetic energy of a vehicle during driver or speed control system initiated vehicle speed retardation.

Still another object of the invention is efficiently to utilize compressed air to provide supplemental torque for an internal combustion engine.

Yet another object of the invention is to combine vehicle operational data to identify efficient opportunities for capture of kinetic energy for storage and reuse for vehicle speed boosting.

The invention provides for these and other objects by providing a vehicle with a multi-cylinder diesel engine which can be operated in a split mode with one or more cylinders diverted to operation as air compressor stages or adapted for use for engine compression braking. Valves are incorporated into the exhaust pipes for selected cylinders which may be closed to prevent or delay exhaust venting from the exhaust pipes. Fluid amplifiers communicate with these exhaust pipes to operate as second stage high compression pumps. Compressed air from the second stage compressors is delivered to a high pressure storage tank for later use to meet high transient torque demand. In the preferred embodiment, high pressure air is used to drive a hydraulic motor coupled to an automatic or semi-automatic transmission and thereby displace torque demands on the engine, especially at takeoff from a standing start. Alternatively, the air may be delivered to an exhaust turbine in a turbo-compounding arrangement to provide additional torque to the engine output shaft. Air may also be forced into the intake manifold of the engines for take offs from a standing start by released compressed air to the drive turbine of a turbo-supercharger.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
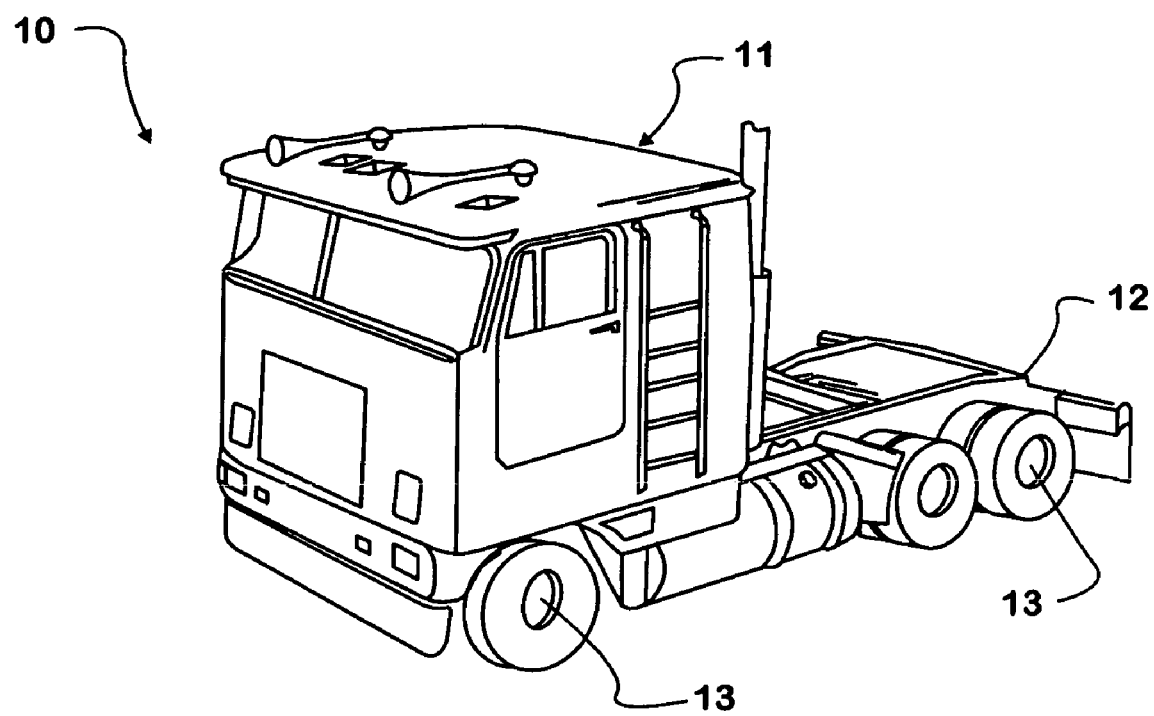
FIG. 1 is a perspective view of a truck tractor with which the invention is advantageously employed.

FIG. 1 illustrates in a perspective view a truck tractor 10 comprising a cab 11 mounted on a chassis 12. A plurality of wheels 13 depend from the chassis. Tractor 10 includes conventional major systems for a vehicle, including a drive train having a diesel engine and a transmission. Tractor 10 also includes air powered drive train boosters as described below. The invention is preferably applied to medium and large trucks which have compressed air systems for brake operation or for starting. These vehicles are typically equipped with a multi-cylinder diesel, which is often adapted for engine compression braking, and compressed air tanks. It will be understood that while the invention is preferably applied to diesels, it would also work, with modification, on internal combustion engines using spark initiated combustion. It may also be advantageously applied to delivery trucks and other vehicles used heavily for stop and go driving.

Figure 2:
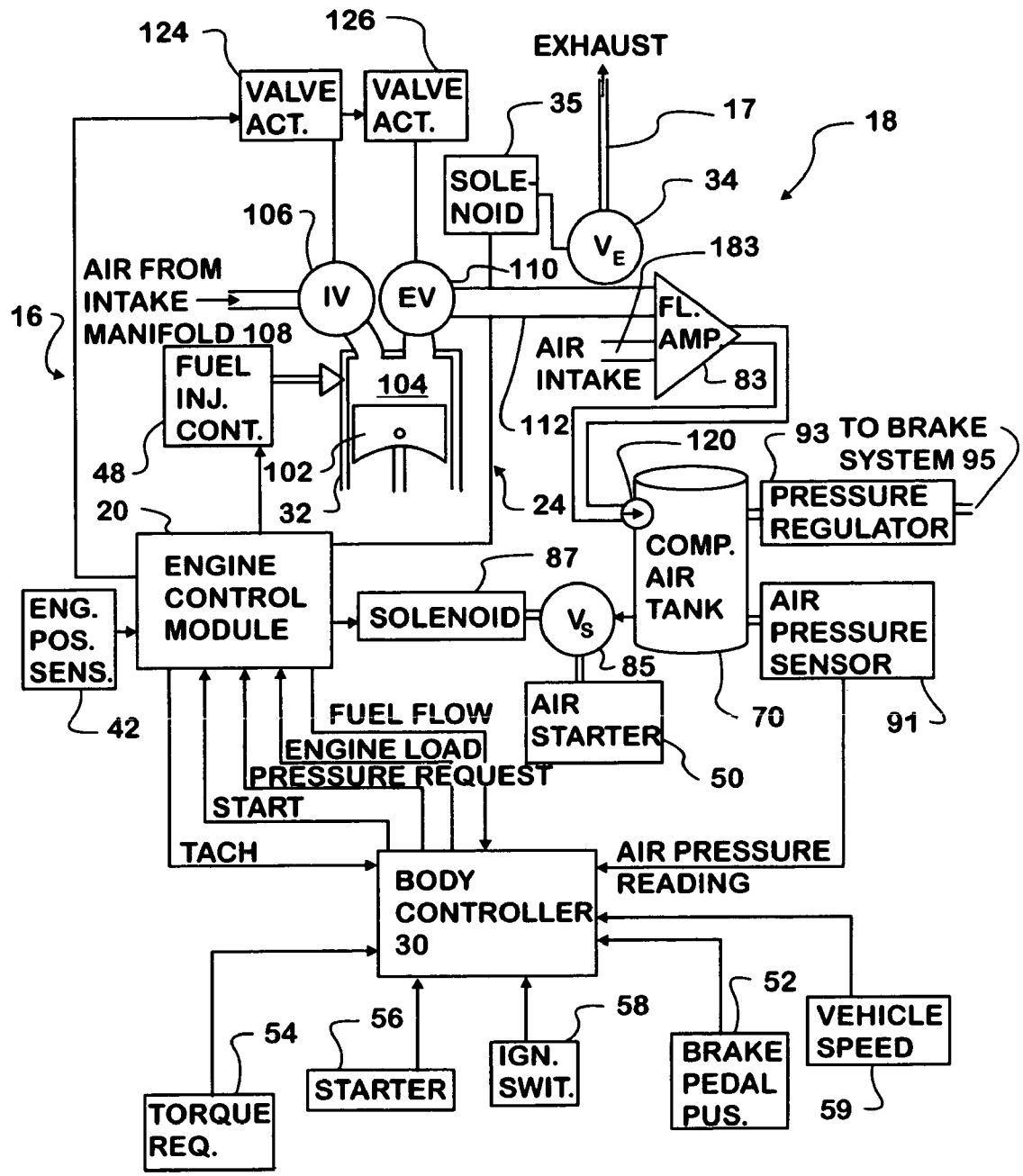
FIG. 2 is a schematic diagram showing an exhaust gas retention and two stage compression system.

Referring now to FIG. 2 an engine air compression and diversion system 18 is illustrated. Compression system 18 uses one or more of the cylinders 32 of a bank 24 of cylinders of a multi-cylinder diesel engine as first stage pumps. In normal operation a piston 102 moves in a conventional, reciprocating fashion within a cylinder 32 with the result that space 104 between the piston and valves 106 and 110 varies in volume. A diesel is conventionally operated as a four cycle engine. Initially intake valve 106 and exhaust valve 110 may be assumed closed. The first cycle is initiated with piston 102 at the top of its travel in cylinder 32 (referred to conventionally as top dead center ("TDC"). Intake valve 106 is opened and air is drawn into cylinder 32 with the following downstroke of piston 102 through the opened intake valve 106 from an intake manifold 108. Intake valve 106 is closed when piston 102 reaches the bottom of its travel in the piston and the air is compressed by the subsequent upward movement of piston 102. This compression stroke of piston 102 develops an approximately 25 to 1 compression ratio of air in the cylinder, raising the temperature of the air above the ignition point of the fuel. Compression ignition of the fuel results upon fuel being injected into cylinder 32 as the piston approaches TDC. The burning air fuel mixture substantially raises pressure in cylinder 32 substantially increasing the downward force on piston 102. This produces a downward power stroke of piston 104. An upward exhaust stroke of piston 102 follows for which exhaust valve 110 is opened. During the exhaust stroke the combustion byproduct is exhausted through exhaust valve 110 into a cylinder exhaust chamber 112. Exhaust chamber 112 can pass air or combustion byproducts from cylinder 32 to an exhaust manifold 17, which collects exhaust gas from bank 24 of cylinders, or retain the air for use of the fluidic amplifier 83. Exhaust valve 110 closes as piston 102 finishes the exhaust stroke. The four cycles repeat as long as the cylinder is firing.

Contemporary practice provides for computer based control of many vehicle and engine functions, usually organized by systems. An engine controller 20 is representative of such a computer used to monitor and control the operation of diesel engine 16. Engine controller 20 times fuel injection to each cylinder 32 by control of a fuel injection controller 48. A camshaft rotates in synchronous with a crank shaft, which in turn is coupled to the pistons in cylinders 32. Thus camshaft position is related to the phase of each piston relative to TDC. Fuel injection is timed in relation to the cam phase position, provided by a cam phase (engine position) sensor 42. Fuel injection is handled by an injector controller 48. The timing of closing and opening of the intake valve 106 and an exhaust valve 110 are effected by engine controller 20 through valve actuators 124 and 126, respectively. Engine controller 20 is also used to operate a starter 50, which may be an air starter using compressed air from a compressed air tank 70. Where an air starter, or some other device using compressed air at the request of engine control module 20 is used, the engine control module is connected to control a solenoid 87 for positioning a valve 85. Air valve 85 connects compressed air tank 70 to the device, here an air starter 50, or as described hereinafter, a drive train booster. The pistons of an engine are connected to a rotatable crankshaft (not shown) which is in turn connected to an output shaft and transmission which continue to move the pistons absent fuel flow to the cylinders, as long as the vehicle retains momentum.

The intake and exhaust valves 106, 110 may be hydraulically actuated using pressurized engine oil, with the camshaft used to operate hydraulic valves controlling intake and exhaust valve operation. Hydraulic valve control may then be overridden by engine controller 20 through valve controllers 124 and 126. For future camless engines, crankshaft phase position may be substituted for cam phase position to the same effect in coordinating the injection of fuel with piston phase and valve timing. In a camless engine, hydraulic valve control uses pressurized engine oil and remains under the control of valve controllers 124 and 126. The position of an exhaust collection shutter valve 34 is coordinated by engine controller 20 using a solenoid 35 as described below.

Engine operation as an air pump requires coordination of the operation of fuel injectors, intake valves, exhaust valves and the exhaust diversion valves. Engine cylinders are operated as pumps in split mode operation, or during engine compression braking. Pump operation entails fuel flow cut off to one or more cylinders 32. Cylinder 32 operates as an air pump when at least some of the remaining cylinders of the engine continue to fire to keep the engine turning over, or when vehicle momentum is coupled to the engine crankshaft from the transmission. After fuel is cut off to a pumping cylinder, the cam actuated lifters can continue to operate intake and exhaust valves 106 and 110, however, for more efficient engine compression braking, the intake valve is open during every down stroke and the exhaust valve is briefly opened as the piston 102 approaches TDC with every up stroke.

Under conditions where some engine power is required, but air pressure status indicates a need for air, valve operation may be altered, and still allow operation of the high pressure air compression system 18. It is not usually necessary under these conditions to draw air to a pumping cylinder 32 and it is preferable not to draw air away from the firing cylinders, or to impose as large a load on the engine as would occur if the non-firing cylinder of the engine were operating, in effect, as a compression brake. For a preferred embodiment of a fluidic amplifier 83, the intake valve 106 may be left closed and the exhaust valve 110 left open after an initial air charge is drawn into cylinder 32 and the fluidic amplifier 83 will continue to supply high pressure air, at least as long as the charge does not leak away. To compensate for such leakage the charge in the pumping cylinder 32 may be occasionally refreshed by opening intake valve 106 during a cycle.

Cylinder 32 operates as the first, or low pressure stage, of a two stage pump. Compressed air from cylinder 32 is used to drive a second or high pressure stage pump. In order to avoid modification of the cylinder 32, some modification of the exhaust manifold 17, or to the exhaust chamber 112 from an individual cylinder, is required to divert the air to drive the high pressure pumps. Shutter valve 34 is located in the wall of exhaust chamber 112 and connects the chamber with exhaust manifold 17. A fluidic amplifier 83, which provides the high pressure stage, communicates with the exhaust chamber 112. Modification of the exhaust system for one cylinder 32 to accommodate one shutter valve 34 and fluidic amplifier 83 is illustrated, but it will be understood that an exhaust system can be modified allowing more than one of cylinders 32 to operate as first stage air pumps. It will also be understood that cylinders may have more than one intake or exhaust valve and that illustration of and reference to the cylinders as having a single valve for exhaust and a single valve for intake has been done for the sake of simplicity in illustration only.

Retention of air pumped from cylinder 32 is controlled by opening and closing shutter valve 34. A control solenoid 40, under the control of engine controller 20, positions shutter valve 34. When shutter valve 34 is closed, and fuel cut off from cylinder 32, air is pumped from cylinder 32 during an up stroke into fluidic or pneumatic amplifier 83. Pneumatic amplifier draws air from the environment through an intake 183, compresses the air and exhausts the compressed air through a check valve 120 into a high pressure air tank 70. Fluid amplifier 83 should have a pressure gain of about 20 to 1 and thus be able to deliver air to compressed air tank at pressures in excess of 2000 psi or twenty times the expected pressure of air from cylinder 32. Shutter valve 34 also operates to release air from the input side of pneumatic amplifier 83 upon opening, which can occur after a brief delay or during engine compression braking or only after pumping is discontinued, as may be preferred for split mode operation. Fluid amplifier 83 could in theory be run from combustion byproduct exhaust gas from cylinder 32 at substantially higher pressures, however, such an arrangement would substantially increase back pressure from the exhaust system and thereby reduce the efficiency of the engine. The 2000 psi pressure level is chosen as the contemporary practical economic limit for a motor vehicle compressed air storage system. A higher pressure could be used given progress in seals and tank strength at affordable prices for a mass produced vehicle.

Air compression occurs in response to a need for compressed air and availability of engine power to provide energy for pumping. A need for air is indicated by a downward variance from the maximum pressure limit for air tank 70. To provide air tank 70 pressure readings, a pressure sensor 91 is provided in fluid communication with air tank 70. Pressure sensor 91 reports air pressure in tank 70 to a computer, preferably body controller 30, or to engine control module 20, depending upon the particular control arrangements provided on a given vehicle. When air pressure in air tank 70 is below the maximum allowed a request for operating air compression system 18 is issued by body controller 30. The degree to which the air pressure falls below the maximum allowed may also be used as an indication of the priority of the request. In order to avoid frequent cycling of the system on and off, air pressure in tank 70 may be required to fall a certain minimum amount below the maximum limit before air compression system 18 is engaged. A number of control regimens may be implemented and which regimen is used at a given time may depend upon the pressure level short fall. Described here are the mechanisms useful in implementing the regimens. The regimens are executed by body controller 30. This computer may also be referred to in the art as a chassis controller or system controller. The functions are implemented on International Truck & Engine vehicles by an electrical system controller.

Finding the preferred periods for operation of the air compression system 18 also requires determining engine load or some other related factor indicative of spare engine capacity. If engine load is low, or better still negative, air compression system 18 can be run at little penalty, and more usually allows energy to be recaptured. Periods of engine compression braking are an ideal opportunity for air compression system 18 operation. Body controller 30 estimates engine load from engine speed, derived from the output of the engine (or cam phase) position sensor 42 and the fuel flow output which are passed to it from engine control module 20. Body controller 30 also receives inputs, either directly or from other system controllers, which indicate the status or condition of an accelerator pedal/torque request input 54, a starter button 56, an ignition switch 58, a brake pedal position switch 52 and a vehicle speed indication source 59, all of which may be used to determine other opportunities to initiate air pumping or the need to use air. Under cruising conditions where air tank 70 is fully pressurized, and no demands for air power occur, body controller 30 may determine leakage rates for air tank 70 from periodic sampling of readings from pressure sensor 91.

A preferred embodiment of the invention will now be described with reference particularly to FIGS. 3A–D where a schematic of the pneumatic amplifier 83 and shutter valve 34 are illustrated. Pneumatic amplifier 83 comprises an exhaust chamber 112 which functions as a pneumatic amplifier input chamber. Exhaust chamber 112 is exposed to a working surface 308 of a shuttle piston 304. Shuttle piston 304 is positioned between chamber 112 and pumping chamber 320. Shuttle piston 304 is mounted to reciprocate in the directions indicated by the double headed arrow "C" allowing air in a pumping chamber 320 to be compressed. A working surface 310 of piston 304 is exposed to pumping chamber 320. Working surface 308 has approximately 20 times the exposed surface area of working surface 310 meaning that the pressure in pumping chamber 320 balances the pressure in chamber 302 when it is about 20 times as great, less the rebound force generated by a compression spring 312. Spring 312 is disposed to urge shuttle piston 304 in the direction "D" up to a limit of the shuttle piston's travel. An intake 183 is provided to the pumping chamber 320, which admits air to the chamber through a one way check valve 314. The air drawn into the chamber is preferably dried ambient air. The spring constant of compression spring 312 is selected to substantially prevent movement of shuttle piston 304 during the relatively low transient pressures occurring during the exhaust of combustion gases.

Figure 3A:
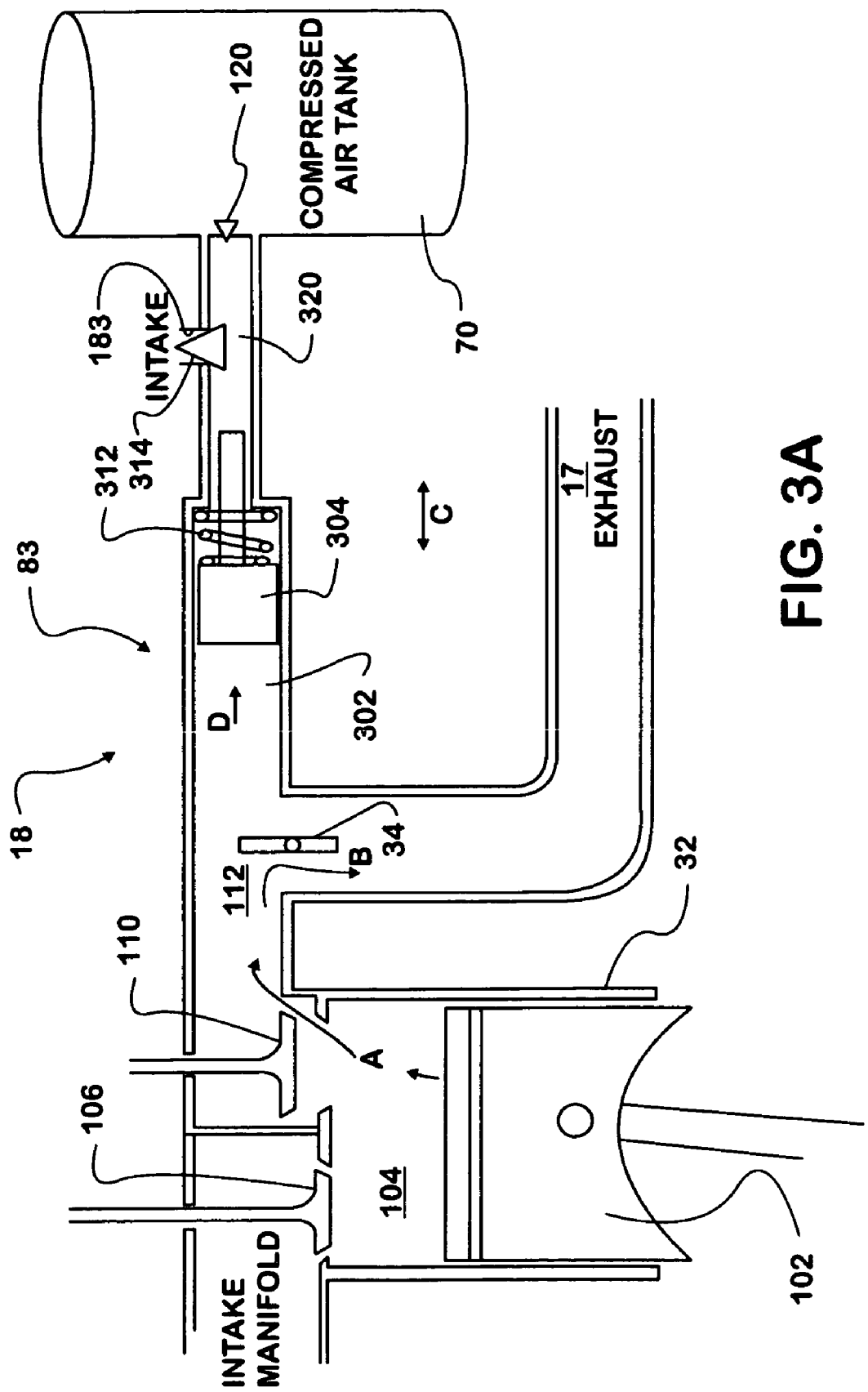
FIGS. 3A–D are schematics illustrating operation of a two stage high pressure air compression system using an engine cylinder as a first, low pressure stage of the pump.

Shutter valve 34 is located in the wall of exhaust chamber 112 and is positioned to control pressurization of the chamber and operation of fluidic amplifier 83. Exhaust chamber 112 should be made as small as practical to minimize the pressure drop occurring in gas exhausted from cylinder 32 when shutter valve 34 is closed. As illustrated in FIG. 3A, exhaust valve 110 is in its opened position, allowing combustion byproducts to escape from cylinder 32. With exhaust valve 110 and shutter valve 34 open, reciprocating piston 102 can force exhaust gas from cylinder 32 through the opened exhaust valve 110 as indicated by arrow "A" into cylinder exhaust chamber 112 and out of exhaust chamber 112 through shutter valve 34 as indicated by the arrow "B" to an exhaust manifold 17.

Figure 3B:
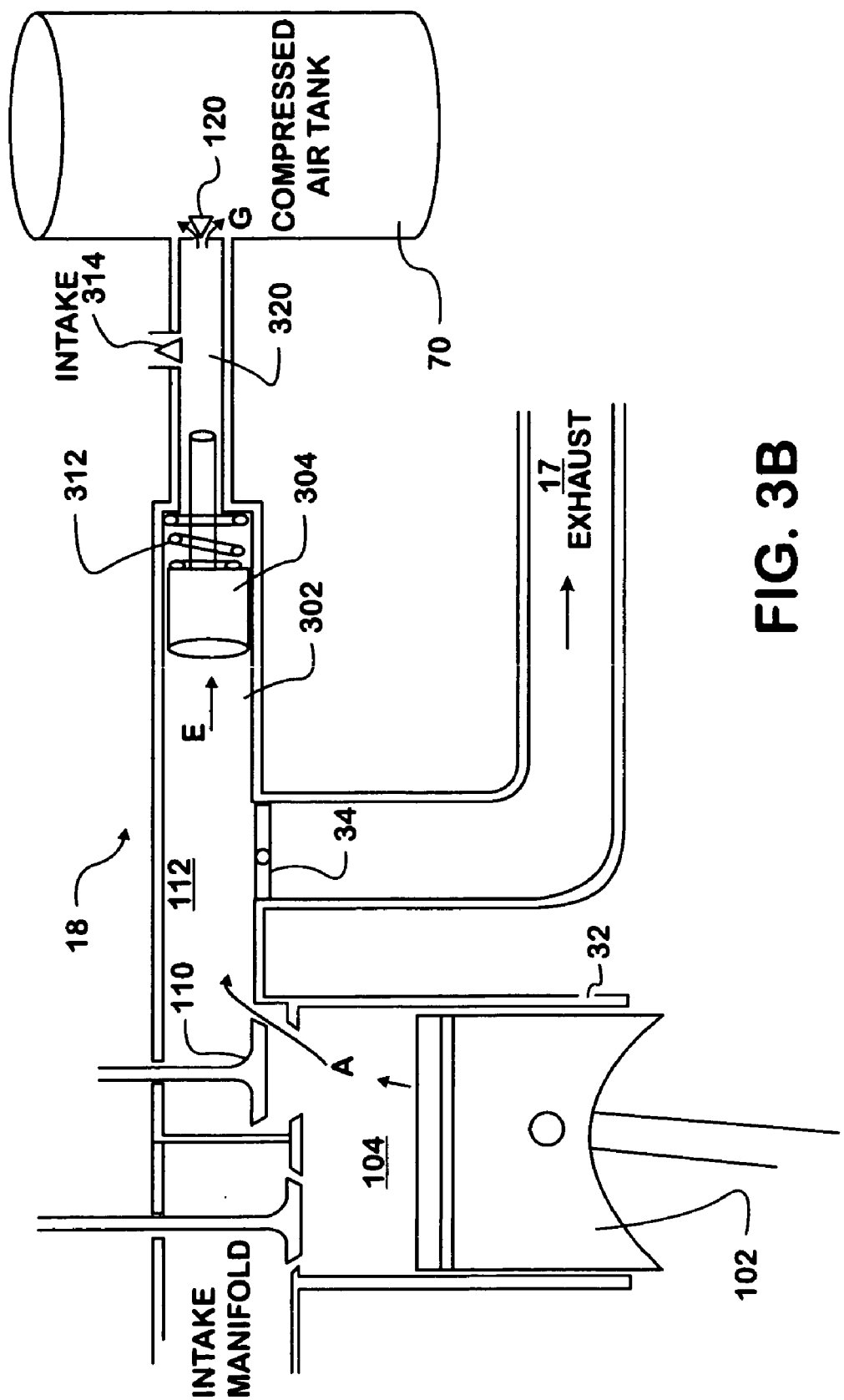

In FIG. 3B pumping of compressed air into compressed air tank 70 is illustrated. Following cessation of fuel injection to cylinder 32 and having drawn a charge of air into cylinder 32, concurrent with compression stroke of piston 102, exhaust valve 110 opens to allow air to be forced from cylinder 32 indicated by arrow "A". Shutter valve 34 closes access to exhaust manifold 17 preventing the flow of air into the exhaust manifold. As pressure in exhaust chamber 112 increases, the resistance of spring 312 is overcome and shuttle piston 304 is forced in the direction indicated by the arrow "E", compressing the air in pumping chamber 320 until check valve 120 admits (in the direction indicated by arrow "G") the air to compressed air tank 70. Again the gain provided by the difference in exposed surface areas of the two ends of the pistons results in a gain of about 20 to 1 in pressurization. The relative areas may be varied to obtain almost any desired gain though. The relative volumes of the exhaust chamber 302 and the pumping chamber 320 and the travel of shuttle piston 304 are chosen so that shuttle piston 304 does not bottom against spring 312 before pressure in the chamber 320 increases sufficiently to balance the pressure in input chamber 302.

Figure 3C:
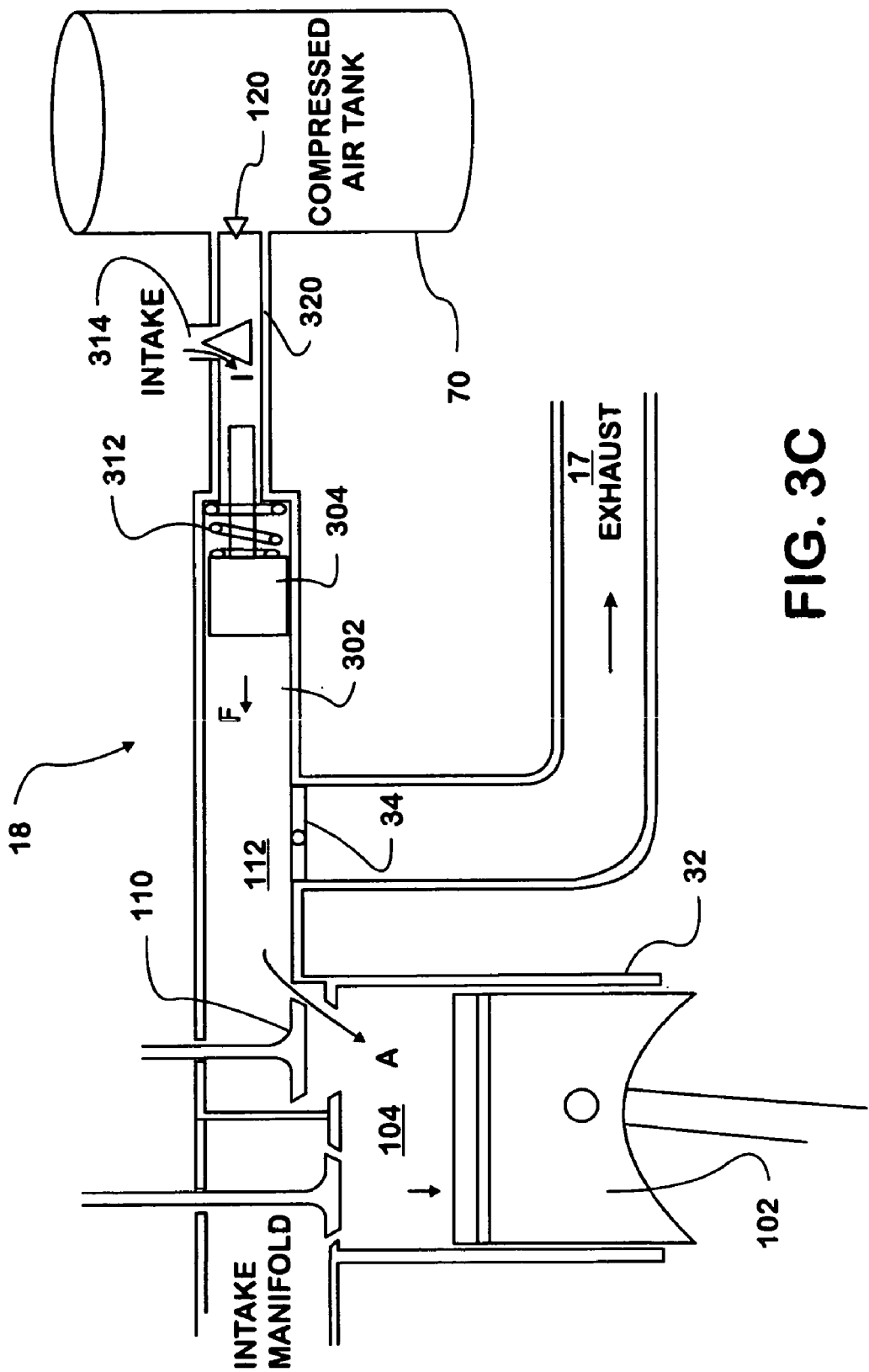

In FIG. 3C a pumping stroke of shuttle piston 304 has completed. Fluid amplifier 83 may be operated without drawing fresh air with each cycle into cylinder 32. Once a charge of air is drawn into cylinder 32, valves 106 and 34 are kept closed, and valve 110 left open. For subsequent pumping steps, as piston 104 moves downwardly, air is drawn from chamber 112 through exhaust valve 110 back into cylinder 32, pulling shuttle piston 304 back into chamber 302, and thereby drawing air in pumping chamber 320 by a now open check valve 314 as indicated by the arrow "I". Piston 102 reciprocates in cylinder 32 resulting in the same charge of air being forced in and out of exhaust chamber 112. Using this operational sequence it may be possible to eliminate compression spring 312, simplifying pneumatic amplifier 83. The effectiveness of such an arrangement will depend upon the quality of the seal formed by shutter valve 34 and some leakage from exhaust chamber 112 is to be expected. Pumping in this manner may require pressure monitoring in chamber 112 and occasionally opening intake valve 106 may be done to replenish the charge. A pressurized first stage system might be employed where, rather than drawing a fresh air charge, pumping begins with a charge of combustion by product from cylinder 32. Again the intake valve 106 and shutter valve 34 remain closed and valve 110 would remain open while piston 102 reciprocates. Pumping with valve 106 held closed and valve 110 held open is preferably employed when the engine is under a positive load and it is undesirable that pumping mimic a compression brake or draw air from the intake manifold and thus divert it from the firing cylinders.

Figure 3D:
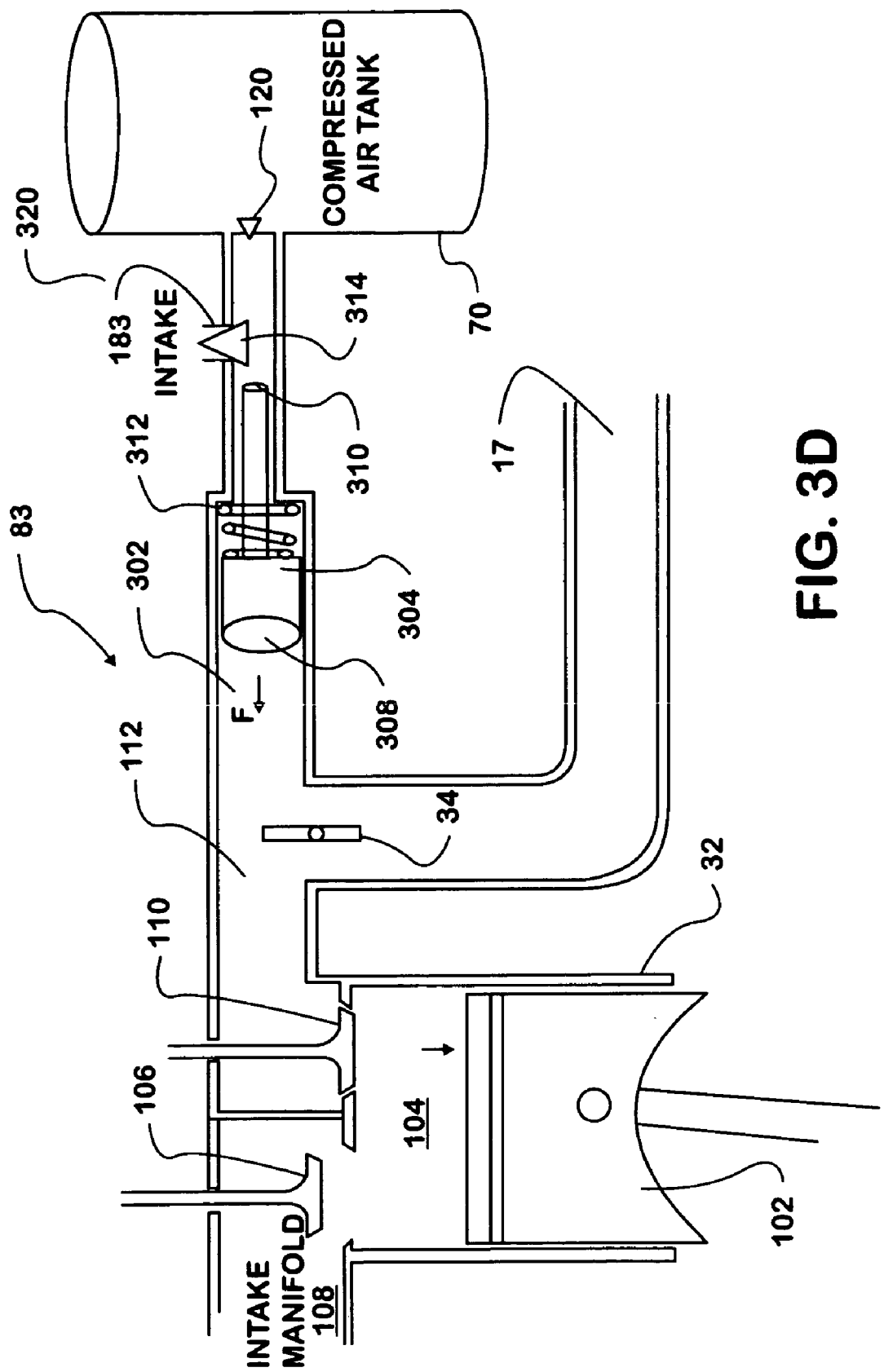

FIG. 3D reflects the configuration of pumping system 18 for recharging fluidic amplifier 83 or for an intake stroke when the engine is being used for compression braking. Exhaust valve 110 to cylinder 32 has closed and intake valve 106 has opened as piston 102 begins an intake stroke, drawing air from intake manifold 108 into chamber 104. Shutter valve 34 opens allowing air in exhaust chamber 112 and exhaust pipe 118 to escape to the exhaust manifold 17. This results in a pressure drop in chamber 112 which allows a combination of air pressure in pumping chamber 320 and spring 312 to return shuttle piston 304 in the direction indicated by the letter "F" to a neutral position. With movement of the shuttle piston 304, air pressure drops below ambient pressure in pumping chamber 320 and air is drawn through intake 183 and check valve 314 into the pumping chamber.

Figure 4:
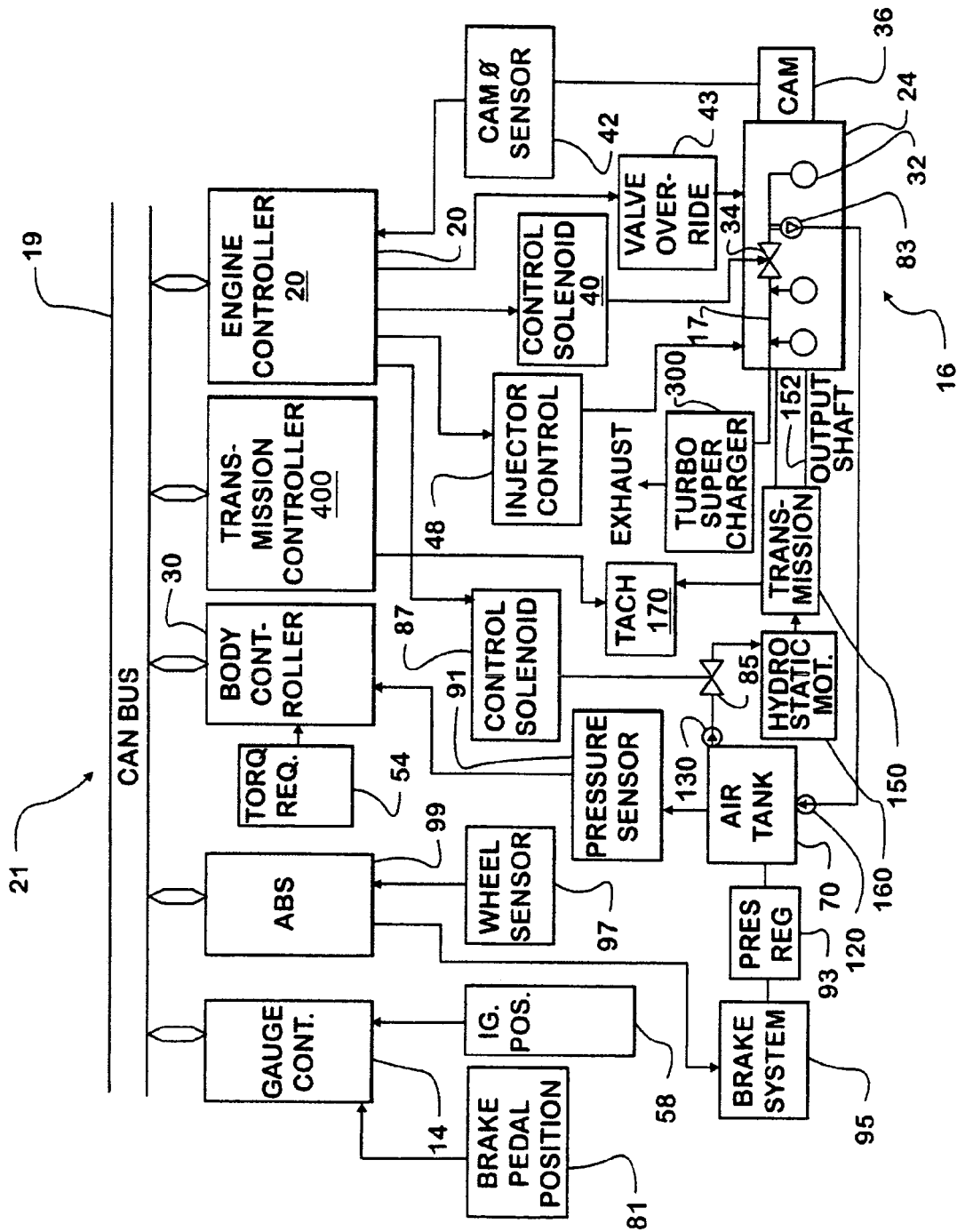
FIG. 4 is a schematic of an kinetic energy recovery and recycling system using a hydrostatic motor to provide supplemental torque to a transmission.
Figure 5:
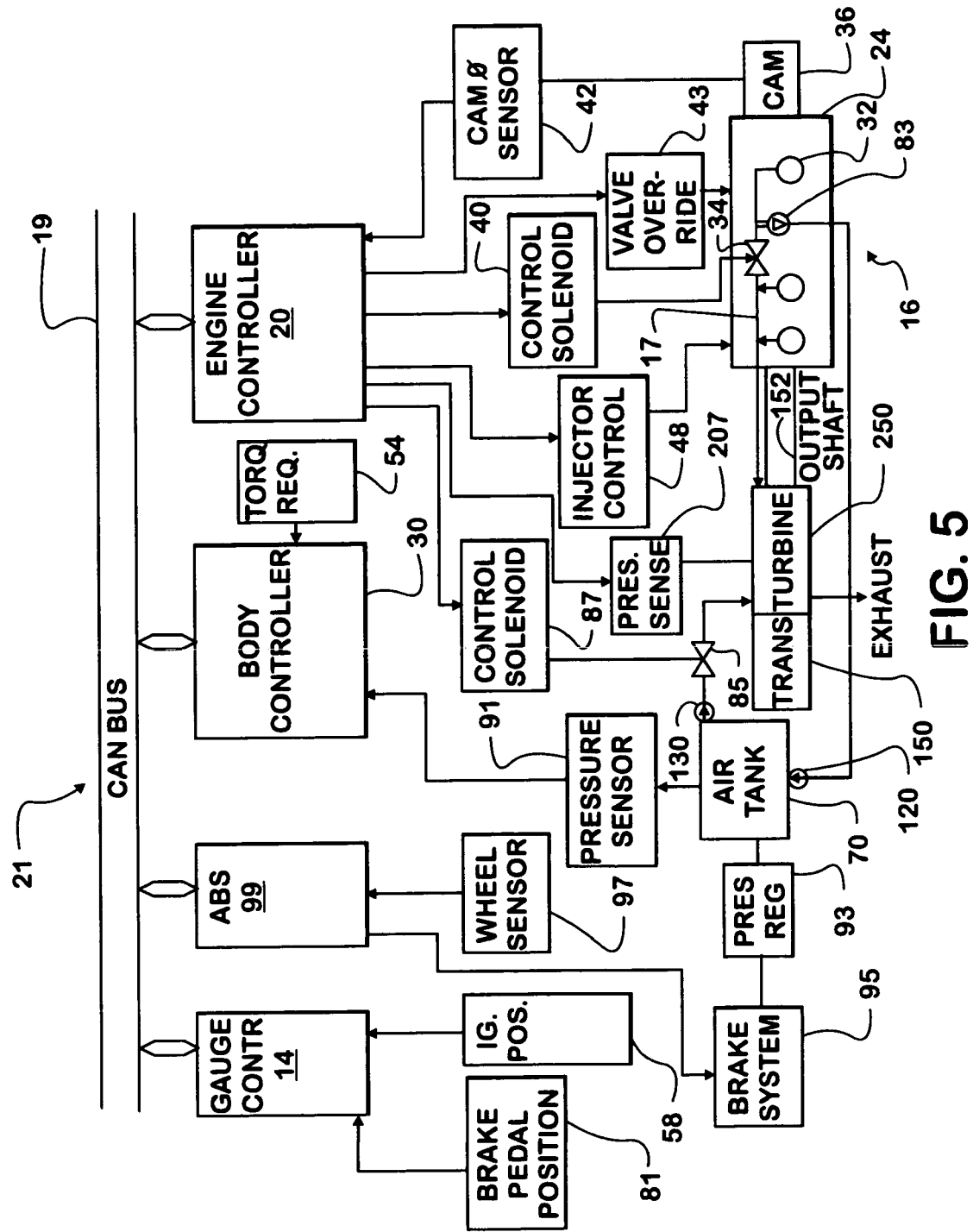
FIG. 5 is a schematic of a kinetic energy recovery and recycling system for a turbo-compounded engine.
Figure 6:
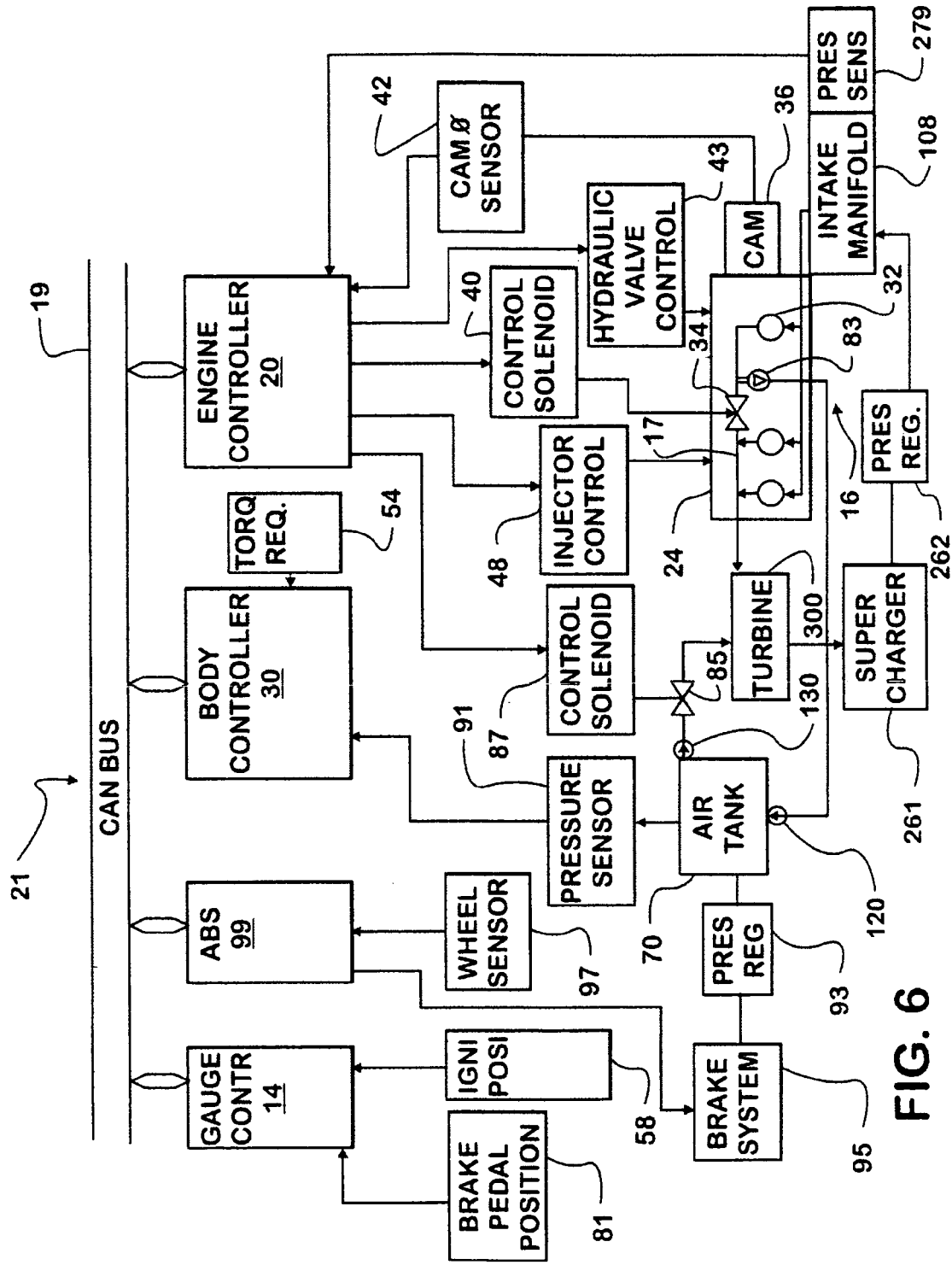
FIG. 6 is a schematic of a kinetic energy recovery and recycling system for a turbo-supercharged engine.

Referring now to FIGS. 4, 5 and 6, the preferred embodiments of the invention are illustrated. Diesel engine 16 is a simplified representation of the engine described above in connection with FIG. 2. The invention is employed to best effect when the various vehicle systems are monitored and data related to operating variables are exchanged between system control processes. This arrangement allows determination of advantageous times to compress air and further determines when there is a demand for air and the capacity to provide it. Compressed air may be applied to vehicle systems such as an air brake system 95 used by a trailer or by an air starter 50 used for starting a diesel engine. Compressed air at the high pressures efficiently recovered by the two stage air compression system described here can also be employed to provide supplemental torque on demand. Utilization of the air also depends upon vehicle operating conditions. In contemporary vehicles major vehicle systems, e.g. the drive train, the engine, the brake system, and so on, are increasingly under the control of system controllers. The system controllers, including an engine controller 20, a transmission controller 400, an anti-lock brake system (ABS) controller 99, a gauge controller 14, and body controller 30, communicate with one another over a controller area bus (CAN) 19, which in the preferred embodiment conforms to the SAE J1939 protocol. CAN bus 19 provides the necessary means to distribute data on vehicle operating conditions and control vehicle operation to support implementation of the invention. CAN networks allow controllers to place non-addressed data on a bus, in standard formats which identify the character and priority of the data and which still other controllers coupled to the bus can be programmed to recognize and operate on.

The different embodiments of the invention provide alternative means to utilize the available high pressure air, which are implemented using slightly different control arrangements. In a typical application the vehicle will incorporate an air brake system 95 which makes competing demands for compressed air. Requests of brake system 95 for air, which are initiated from the gauge controller 14, which monitors brake pedal position sensor 81, are afforded a higher priority than other demands for compressed air. Requests for air and determinations of when to pressurize air are determined only when the vehicle is on, as indicated by the position of an on/off switch 58, which may be monitored by gauge controller 14 or by body controller 30. ABS controller 99 may, in some vehicles, be utilized to determine vehicle speed from the wheel rotational speed sensors 97 or from transmission tachometer 170. Vehicle speed is used for determining when to use compressed air. A transmission controller 130 is provided on vehicles equipped with automatic or semi-automatic transmissions and provides gear selection for the transmission 150 based on engine speed, vehicle speed, available torque and torque demand. Engine controller 20 typically communicates with a tachometer 170 coupled to an output shaft from a transmission 150 to determine vehicle speed.

In the embodiment of FIG. 4 a hydrostatic motor 160 provides drive train boost on demand. Hydrostatic motor 160 is used to boost a transmission 150 normally driven by the output shaft 152 from engine 16. Operation of hydrostatic motor 160 is supported by compressed air from a high pressure air tank 70. Air passes from air tank 70 through a check valve 130 and a valve 85 to hydrostatic motor 170. Valve 85 is positioned by a solenoid controller in response to a control signal from engine control module 20. Hydrostatic motor 160 directly boosts transmission 150 to meet part of the torque demand received by the engine controller 20 from body controller 30, which in turn determines torque demand from the position of an accelerator pedal 54 and torque availability for the engine by subtracting a load estimate from engine capacity (stored in look up tables). Engine controller 20 allocates the response between the hydrostatic motor 160 and engine 16 as a function of engine rpms (determined from cam phase sensor 42), the availability of compressed air in air tank 70, provided by a pressure sensor 91 through body controller 30, and vehicle speed. Engine 16 has a torque output curve as a function in engine rpm's and load which is low at low rpm's and climbs to a peak as rpm's increase. Supplemental torque is of greatest value for taking off from a standing start where no gear choice is available allowing for operation of the engine in an advantageous portion of the engine torque curve. Boost from hydrostatic motor 160 may also be used to limit loading on output shaft 152 from engine 16 to transmission 150, allowing the use of a lower weight crankshaft. Vehicles equipped with on board estimation of vehicle load can advantageously adjust the amount of boost to provide the desired acceleration while limiting the load on output shaft 52. Reducing torque loads on diesel engines also reduces piston blow-by, extending engine oil life and reducing particulate emissions. Exhaust from exhaust manifold 17 is handled conventionally being routed through an exhaust turbine 300 for a turbo-supercharger. Boost is tapered off as engine speed increases and more engine torque becomes available by progressively restricting flow through valve 85.

Referring to FIG. 5, application of the invention in a turbo-compounded engine is illustrated. An exhaust turbine 250 is connected to exhaust manifold 17 and mechanically coupled to output shaft 152 in conventional fashion to boost the output to a transmission 150 from the crankshaft. Compressed air can be fed to the turbine 250 as a substitute for engine exhaust or mixed with the engine exhaust to boost the turbine's mechanical output. Back pressure in power turbine 250 is monitored using a turbine pressure sensor 207 which is connected to engine controller 20 for reporting readings. Providing boost to the output shaft through a power turbine is useful for vehicles for starting the vehicle from a standing start when exhaust back pressure is low. Air release here can be triggered by coincidence of a high torque request from body controller 30, low speed and by engine load increasing with the vehicle in gear.

Referring to FIG. 6, a vehicle is equipped with a turbo-supercharger (comprising turbine 300 and supercharger 261, which forces air by way of a pressure regulator 262 to an engine intake manifold 108. Compressed air tank 70 is connected by check valve 130 and valve 85 to feed air to turbine 300 resulting in increased boost from supercharger 261 by way of pressure regulator 262 to intake manifold 108. Air pressure in intake manifold 108 is monitored by a pressure sensor 279 which feeds pressure readings to an engine controller 20. Air is forced into the intake manifold 108 upon occurrence of torque request, low vehicle speed, low engine speed and falling or low intake manifold pressure sensed by pressure sensor 279. Here, rather than supplying a direct torque boost, the invention promotes good combustion and reduces the intake pumping burden on engine 16 during starts thus providing an indirect boost to torque. Pressure sensor 279 provides feedback limiting for the amount of air released to the intake manifold. While compressed air could in theory be directed directly from the air tank 70 to intake manifold 108 it is considerably simpler from a design perspective to utilize existing supercharger boost arrangements and provide an alternative drive system for the supercharger. Supercharger lag time may also be reduced by using compressed air to spin up the power turbine ahead of exhaust gas availability.

For any of the embodiments, engine 16 load can be estimated by engine controller 20. Engine control module 20 determines fuel flow for injector controller 48 in response to torque requests from body controller 30. Engine load is related to brake mean effective pressure which in turn can be estimated as the fuel flow divided by engine speed. Comparison of the result to a look up table keyed to engine rpm's allows determination of the amount of spare capacity available from a diesel.

Figure 7:
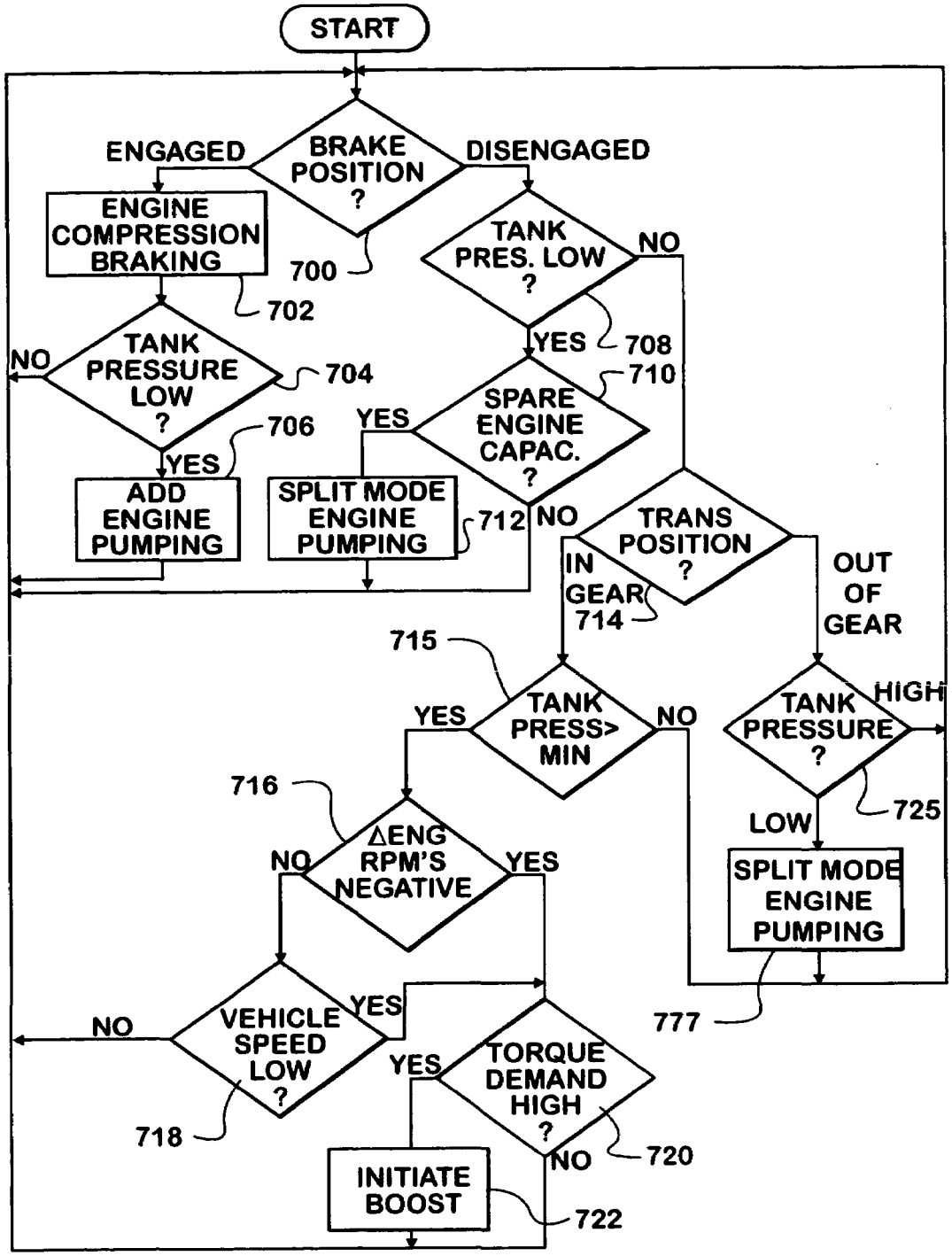
FIG. 7 is a simplified flow chart illustrating operation of the invention.

Referring to FIG. 7, a simplified flow chart illustrating operation of the invention is depicted. Vehicle braking has a priority claim on air and accordingly the initial step 700 is a determination if the brake system is engaged. If the brakes are engaged engine 16 may be used to help slow the vehicle and at step 702 engine compression braking is started. Next, at step 704, tank pressure is read and if it low, step 706 is executed to initiate two stage high pressure air compression. In order to maintain compression braking efficiency, air will be exhausted from the intermediate plenum of the two stage pumps rather than returned to the engine cylinders. If tank pressure does not require adding air, engine pumping may be omitted. Following the NO branch from step 704, or following step 706 the process loops to continue monitoring brake position.

If the brakes are determined at step 700 to be disengaged, step 708 is executed to determine if air pressure is too low to permit use of air pressure to permit recovery of energy from the air. If may be noted that the tank pressure limit here may or may not be the same as that measured at step 704. Making the limit for step 708 lower than the limit for step 704 promotes air compression occurring during periods of braking rather than during any period when spare engine capacity is available. If air tank 70 pressure falls below the minimum required by step 708 the YES branch from the decision block is taken to step 710 where it is determined if the engine has a margin of spare capacity. If YES, split mode operation of engine 16 may be initiated at step 712 to allow some of the cylinders to be used to restore air pressure to a minimum desired level. Following the NO branch from step 710 or step 712 processing loops back through step 700 to determine brake position.

Following the YES branch from step 708 processing is advanced to the torque boost utilization steps using compressed air. It is preferred that use of compressed air for driving a hydrostatic motor or to feed the turbine of a turbo compound engine be implemented with over pressure recovered from vehicle braking and not from running the engine in a split mode under circumstances where engine compression braking is not required. This preference is implemented by limiting operation of the hydrostatic motor and turbo-compounding boost to periods when tank pressure reflects pressure added by engine compression braking. However, for vehicles used as delivery vehicles in urban or suburban areas where there is a great deal idle time, another loop may be added following the NO branch from step 708 to allow split mode pressure operation during idle periods of the vehicle's engine. This air pressure is available for non-brake devices to reduce variability in engine rpm's. This type of operation can be energy efficient because the engine is allowed to operate at a constant rpm and it should be effective in reducing emissions.

Where the idle option is included, step 714 is executed following a NO decision at step 708 to determine if the transmission is in gear or out of gear. This information is supplied by the transmission controller 130. If the transmission is out of gear, split mode operation of the engine is permitted to boost tank 70 air pressure to the maximum allowed level. Following the "out of gear" determination, step 725 is executed to determine if tank pressure is at the maximum allowed level. If it is the process returns to the step 700. If not, split mode operation of the engine to add air is initiated at step 777 and processing returns to brake position determination step 700.

Following determination that the transmission is reported to be in gear at step 714, step 716 is executed to determine if engine rpm's are falling. If YES, then step 720 is executed to determine if torque is being requested by the body controller 30. If this determination is also affirmative, then air is released to boost torque output at step 722. Following step 722 or the NO branch of step 720 process execution is returned to brake position determination at step 700. Following the NO branch from step 716, step 718 is executed to determine if vehicle speed is low, or stopped. If YES, step 720 follows. If NO, processing returns to the brake position determination step 700. If will be understood that the steps 716 and 718 could be rearranged, or that a step determining whether intake manifold pressure was low could be substituted if measuring for declining engine rpm's.

Allocation of the load between the internal combustion engine and the pressurized air output boost system is determined by the engine controller 20 which varies the position of valve 85 to control flow of compressed air. Available torque from compressed air is readily determined empirically and stored in look up tables.

The invention provides for recapturing and reusing kinetic energy otherwise lost during braking by employing temporarily unused or unneeded cylinders in a diesel engine as first stages in high pressure two stage air pumps. The energy is recycled in a number of ways to boost drive train output, such as deploying compressed air supply torque to the transmission using a hydrostatic motor, delivering the air to the turbine of an turbo-compound engine, or increasing intake manifold pressure by driving the power turbine for a turbo-supercharger. The consequential reduction in load on the engine during take off from a standing start or during periods climbing an upgrade which require low engine speed operation can reduce pollutant production otherwise characteristic of diesels at low rpms.

While the invention is shown in only one of its forms, it is not thus limited but is susceptible to various changes and modifications without departing from the spirit and scope of the invention.

What is claimed is:

1. A motor vehicle comprising:
   an air storage tank mounted on the motor vehicle;
   a drive train including a transmission and an internal combustion engine having a plurality of cylinders, an exhaust pipe from each cylinder and a crank shaft for turning the a transmission;
   a multi-stage compressor including at least a first cylinder of the internal combustion engine for operation as a low pressure compression stage to pump air to the exhaust pipe for the first cylinder and a high pressure stage coupled to the exhaust pipe for the first cylinder for actuation and an outlet from the high pressure stage connected to supply high pressure air to the air storage tank;
   a controllable discharge valve from the air storage tank; and
   a drive train booster connected by the controllable discharge valve to the air storage tank for receiving pressurized air.

2. A motor vehicle as set forth in claim 1, further comprising:
   a controller area network;
   an engine controller communicating with the controller area network and for determining engine load and engine torque capacity information and for implementing engine compression braking and split mode operation of the engine;
   a braking system for retarding vehicle velocity including through requests for engine compression braking placed on the controller area network;
   a pressure sensor associated with the air storage tank for generating pressure signals for the engine controller; and
   the engine controller being further responsive to a first minimum pressure sensor reading below the maximum allowed pressure for initiating operation of the multi-stage compressor during engine compression braking and still further responsive to pressure sensor readings below a second greater minimum threshold for initiating split mode operation engine and concurrently initiating operation of the multi-stage compressor during periods when the engine has excess capacity.

3. A motor vehicle as set forth in claim 2, wherein the drive train booster comprises a compressed air powered hydrostatic motor coupled to the transmission.

4. A motor vehicle as set forth in claim 2, wherein the drive train booster comprises a power turbine coupled to the crankshaft.

5. A motor vehicle as set forth in claim 2, wherein the drive train booster comprises:
   a supercharger having an exhaust driven power turbine; and
   an intake manifold for the internal combustion engine coupled for boost from the supercharger.

6. A motor vehicle as set forth in claim 1, further comprising:
   a pressure sensor for the air storage tank;
   a body controller for estimating load on the internal combustion engine and for receiving pressure readings from the pressure sensor;
   the body controller being responsive to an estimate of a negative load on the internal combustion engine and a pressure reading below a maximum allowed level for the air storage tank for initiating pump operation of the at least first cylinder; and the body controller being further responsive to an estimate of a non-negative load on the internal combustion engine which leaves spare load capacity and a pressure reading for the air storage tank below a minimum limit for initiating split mode operation of the internal combustion engine and pump operation of the at least first cylinder.

7. A motor vehicle as set forth in claim 6, further comprising:
a torque request input coupled to the body controller; and
the body controller being responsive to a request for torque and an air pressure reading from the pressure sensor exceeding a boost threshold minimum for directing the opening of the controllable discharge valve to the drive train booster.

8. A motor vehicle as set forth in claim 6, further comprising a brake pedal position sensor wherein a negative load on the internal combustion engine is indicated by a brake pedal position sensor signals.

9. A vehicle comprising:
an engine controller
a drive train including a transmission, an engine having a plurality of cylinders, and an output shaft from the engine, the engine having at least one cylinder which is operated as non-firing air pumps under the control of the engine controller;
exhaust pipes from the cylinders;
a shutter valve located in the exhaust pipe for said at least one cylinder which is diverted to operation as an air pump, the shutter valve being positionable to retard exhaust of air pumped from the cylinder;
a fluid amplifier having an input communicating with the exhaust pipe between the cylinder and the shutter valve to operate as second stage high compression fluid pump;
a high pressure storage tank connected to the fluid amplifier to receive compressed fluid; and
a drive train booster connected to the high pressure storage tank to receive compressed fluid.

10. A motor vehicle as set forth in claim 9, further comprising:
a controller area network;
controller means for generating a vehicle speed signal for broadcast on the controller area network;
the engine controller communicating with the controller area network for providing engine load and engine torque capacity information and for implementing engine compression braking and split mode operation of the engine during which said at least one cylinder operates as non-firing air pumps;
a braking system for retarding vehicle velocity including through requests for engine compression braking placed on the controller area network;
a pressure sensor associated with the high pressure fluid storage tank for generating pressure signals and placing the signals on the controller area network; and
the engine controller being further responsive to pressure sensor readings below the maximum allowed pressure for operating the shutter valve to cause the fluid amplifier to pump fluid into the high pressure storage tank during engine compression braking and still further responsive to pressure sensor readings below a second greater minimum threshold for initiating split mode operation of the engine and concurrently operating the shutter valve to actuate the fluid amplifier to pump fluid into the high pressure storage tank when internal combustion engine capacity is available.

11. A motor vehicle as set forth in claim 10, further comprising:
a body controller connected to the controller area network for generating requests for torque from the internal combustion engine through the engine controller;
a boost valve actuated by an engine controller for providing pressurized fluid from the high pressure tank to the drive train booster; and
the engine controller being responsive to high transient torque requests and available pressure in the high pressure storage tank for opening the boost valve.

12. A motor vehicle as set forth in claim 11, wherein the drive train booster is a hydraulic motor coupled to drive an automatic or semi-automatic transmission.

13. A motor vehicle as set forth in claim 11, wherein the drive train booster is a power turbine coupled to supply torque to an engine output shaft.

14. A motor vehicle as set forth in claim 11, wherein the drive train booster is a turbo-supercharger.

15. A kinetic energy recovery system for a vehicle, comprising:
an internal combustion engine having a plurality of combustion cylinders and exhaust ports from the combustion cylinders;
a vehicle drive train connected to the internal combustion engine as prime mover for the vehicle drive train;
a multi-stage air compression system;
at least one of said plurality of combustion cylinders of the internal combustion engine being available as a a low pressure stage in the multi-stage air compression system;
a high pressure stage for the multi-stage compression system actuated by operation of the low pressure stage for pumping air;
compressed air storage coupled to receive air pumped from the high pressure stage;
a compressed air operated drive train booster coupled by a pressure regulating valve to the compressed air storage;
a controller area network;
sensors distributed about the vehicle providing vehicle information for distribution on the controller area network; and
a body controller and an engine controller coupled to receive information on the controller area network and responsive thereto for coordinating operation of the multi-stage air compression system, the compressed air storage and the drive train booster.

* * * * *